(12) United States Patent
Arai

(10) Patent No.: US 7,088,519 B2
(45) Date of Patent: Aug. 8, 2006

(54) ZOOM LENS SYSTEM

(75) Inventor: Daisaku Arai, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/948,290

(22) Filed: Sep. 24, 2004

(65) Prior Publication Data

US 2005/0068635 A1 Mar. 31, 2005

(30) Foreign Application Priority Data

Sep. 29, 2003 (JP) .............................. 2003-338480

(51) Int. Cl.
*G02B 15/14* (2006.01)
*G02B 15/177* (2006.01)

(52) U.S. Cl. ....................... 359/676; 359/691

(58) Field of Classification Search ................ 359/676, 359/679, 683–692

See application file for complete search history.

(56) References Cited

U.S. PATENT DOCUMENTS 5,703,727 A * 12/1997 Lawson et al. ............. 359/802

FOREIGN PATENT DOCUMENTS

JP 7-199067 8/1995
JP 2003-121738 4/2003

* cited by examiner

*Primary Examiner*—Scott J. Sugarman
*Assistant Examiner*—Darryl J. Collins
(74) *Attorney, Agent, or Firm*—Miles & Stockbridge P.C.

(57) ABSTRACT

The object is to provide a zoom lens system having a zoom ratio of 2.5 or more, compactness and high optical performance, applicable to a plurality of imaging devices with different image heights. According to one aspect of the present invention, a zoom lens system applicable to a plurality of imaging devices having different image heights with each other by partially sharing zooming trajectories without changing an optical element of the zoom lens system.

27 Claims, 4 Drawing Sheets

ZOOM LENS SYSTEM

The disclosures of the following priority application is herein incorporated by reference:

Japanese Patent Application No. 2003-338480 filed on Sep. 29, 2003.

BACKGROUND OF THE INVENTION

1. Field of the Invention

The present invention relates to a zoom lens system and in particular to a zoom lens system suitable for a video camera and an electronic still camera using a solid-state imaging device applicable to a plurality of imaging devices with different image heights.

2. Related Background Art

Recently, in a rapidly spreading field of a digital camera or a video camera, lenses for such camera are required to be compact and have high optical performance as those for general cameras. On the other hand, since imaging devices have various image sizes, the optical system has to be redesigned upon changing the size of the imaging device.

A zoom lens, for example, is ideally designed for a particular image height for a certain imaging device and other image heights of the other imaging devices are not taken into consideration.

In order to solve the problem, Japanese Patent Application Laid-Open No. 2003-121738 proposes that when an imaging device having other image height than designed one is used, it is coped with removing a part of optical elements from the zoom lens.

However, in the example disclosed in the above patent document, when the image height of the imaging device is changed, since the zoom lens copes with removing a part of the zoom lens components, there is a possibility that optical performance become worse for a plurality of imaging devices having different image heights. Moreover, a mechanism for removing a part of optical elements has to be arranged, so that there is a problem that the zoom lens system becomes complicated and large.

SUMMARY OF THE INVENTION

The present invention is made in view of the aforementioned problem and has an object to provide a zoom lens having a zoom ratio of 2.5 or more, compactness and high optical performance, applicable to a plurality of imaging devices with different image heights.

According to one aspect of the present invention, a zoom lens system applicable to a plurality of imaging devices having different image heights with each other by partially sharing zooming trajectories without changing an optical element of the zoom lens system.

In one preferred embodiment of the present invention, the following conditional expression is preferably satisfied:

$$fwY \leq (Y/Y\min) \times fwY\min$$

where Y denotes an image height of one imaging device among the plurality of imaging devices, fwY denotes the focal length in a wide-angle end state of the imaging device with the image height of Y, Ymin denotes the smallest image height among the plurality of imaging devices, and fwYmin denotes the focal length in the wide-angle end state of the imaging device having the image height Ymin.

In one preferred embodiment of the present invention, the most object side lens group has negative refractive index.

In one preferred embodiment of the present invention, focusing is carried out by moving either the most object side lens group or the most image side lens group along the optical axis.

Other feature and advantages according to the present invention will be readily understood from the detailed description of the preferred embodiments in conjunction with the accompanying drawings.

DESCRIPTION OF THE PREFERRED EMBODIMENTS

Figure 1:
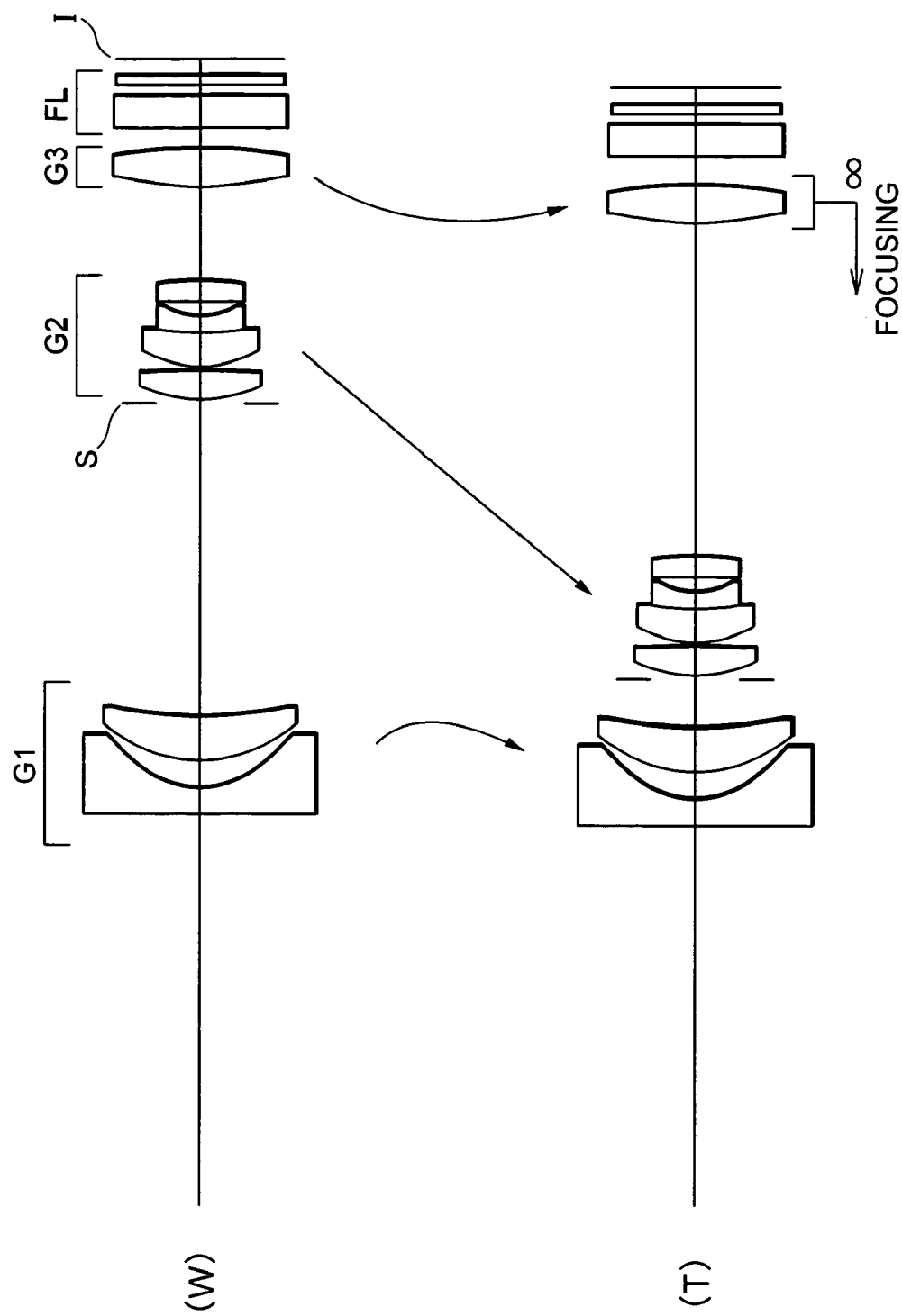
FIG. 1 is a diagram showing a sectional view of a zoom lens system according to Example 1 of the present invention in a wide-angle end state (W) and a telephoto end state (T).

A zoom lens system according to the present invention is explained below.

A zoom lens system according to the present invention has, in order from an object, a first lens group G1 having negative refractive power, a second lens group G2 having positive refractive power, and a third lens group G3 having positive refractive power. When the state of lens group positions varies from a wide-angle end state to a telephoto end state for carrying out zooming, the first lens group G1, the second lens group G2, and the third lens group G3 move such that a distance between the first lens group G1 and the second lens group G2 decreases, and a distance between the second lens group G2 and the third lens group G3 varies.

Moreover, focusing is carried out by moving the third lens group G3 along the optical axis. An aperture stop S is arranged between the first lens group G1 and the second lens group G2 and is moved in a body with the second lens group G2 upon zooming. A filter group FL including a low-pass filter and an IR (infrared) cutoff filter is arranged between the third lens group G3 and an image plane I.

In a zoom lens system according to the present invention, a plurality of imaging devices with different image heights can be selectively applied by partially sharing the zoom trajectories on which the respective lens elements of the first through third lens groups are moved upon zooming from the wide-angle end state to the telephoto end state without changing the optical system of the zoom lens system.

Furthermore, in a zoom lens system according to the present invention, the following conditional expression (1) is preferably satisfied:

$$fwY \leq (Y/Y\min) \times fwY\min \quad (1)$$

where Y denotes an image height of one imaging device among a plurality of imaging devices, fwY denotes the focal length in the wide-angle end state of the imaging device having the image height Y, Ymin denotes the smallest image height among the plurality of imaging devices, and fwYmin denotes the focal length in the wide-angle end state of the imaging device having the image height Ymin.

Conditional expression (1) defines an appropriate relation between the ratio of the smallest image height Ymin to a larger image height Y, and a zoom range, with respect to a plurality of imaging devices to be used.

When the values falls out of conditional expression (1), distortion with respect to the smallest image height Ymin among the image heights of a plurality of imaging devices, becomes worse and quantity of peripheral light becomes too much reduced, and chromatic aberration of the imaging device Y becomes worse in the telephoto end state, so that it is undesirable.

In a zoom lens system according to the present invention, the first lens group, which is the most object side lens group, has preferably negative refractive power. Accordingly, the whole optical system can be compact.

Although the third lens group, which is the most image side lens group, is moved upon focusing, instead of the third lens group, the first lens group, which is the most object side lens group, may be moved. In either case, deterioration of imaging performance upon focusing can be small.

Moreover, any surface of the first lens group through the third lens group may be made of a diffractive surface. Any lens element of the first lens group through the third lens group may be a graded index lens (GRIN lens) or a lens made of plastic. By shifting any one or any portion of the first lens group through the third lens group perpendicularly to the optical axis or along a curve around a point, the zoom lens can be made as a vibration reduction lens.

A zoom lens system according to each Example of the present invention is explained with reference to accompanying drawings.

EXAMPLE 1

Figure 2:
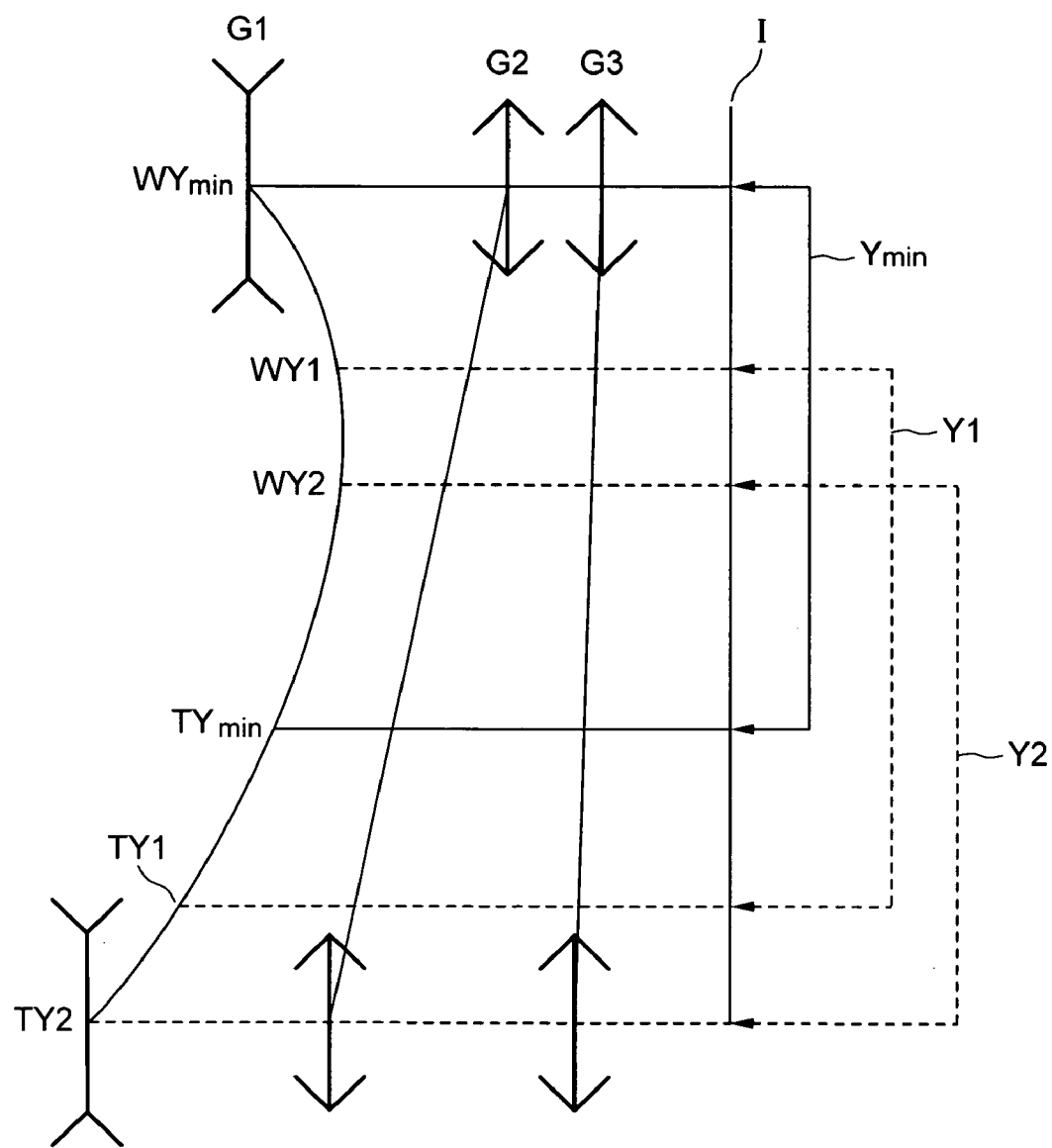
FIG. 2 is a drawing illustratively showing power arrangement and zoom trajectories corresponding to a plurality of imaging devices with different image heights of a zoom lens system according to Example 1 of the present invention.

FIG. 1 is a diagram showing a sectional view of a zoom lens system according to Example 1 of the present invention in a wide-angle end state (W) and a telephoto end state (T). FIG. 2 is a drawing illustratively showing power arrangement and zoom trajectories corresponding to three imaging devices with different image heights of a zoom lens system according to Example 1 of the present invention.

In FIG. 1, the zoom lens system has, in order from the object side, a first lens group G1 having negative refractive power, a second lens group G2 having positive refractive power, a third lens group G3 having positive refractive power. When the state of lens group positions varies from a wide-angle end state (W) to a telephoto end state (T), the first lens group G1, the second lens group G2, and the third lens group G3 move such that a distance between the first lens group G1 and the second lens group G2 decreases and a distance between the second lens group G2 and the third lens group G3 varies. Focusing is carried out by moving the third lens group G3. An aperture stop S is arranged between the first lens group G1 and the second lens group G2, and is moved with the second lens group G2 in a body upon zooming. A filter group FL composed of a low-pass filter, an IR cutoff filter, and the like is arranged between the third lens group G3 and an image plane I.

In FIG. 2, when a zoom lens system according to Example 1 of the present invention is used for three imaging devices with different image heights with each other, the respective zoom trajectories are shown.

Among the imaging devices which the zoom lens system is applicable to, when an imaging device having the smallest image height Ymin is used, the state of the wide-angle end is expressed by WYmin and the state of the telephoto end is expressed by TYmin. When an imaging device having the image height of Y1 is used, the state of the wide-angle end is expressed by WY1 and the state of the telephoto end is expressed by TY1. When an imaging device having the image height of Y2 higher than Y1 is used, the state of the wide-angle end is expressed by WY2 and the state of the telephoto end is expressed by TY2.

As is understood from FIG. 2, in the zoom lens system according to Example 1 of the present invention, in accordance with three imaging devices having different heights with each other, three lens groups G1–G3 are moved in respective different ranges along respective common zoom trajectories upon zooming, so that approximately the same zoom ratio and image size can be secured without lowering optical performance.

A zoom lens system according to Example 1 of the present invention is constructed such that zoom trajectories of the lens groups G1–G3 can be varied from the wide-angle end state WYmin to the telephoto end state TYmin and the range in the zoom trajectories can be selected in accordance with the image height of the imaging device, so that it is applicable to imaging devices having different image heights.

Various values according to Example 1 are shown in Table 1. In Specifications, Ymin denotes the smallest image height among the plurality of imaging devices to be used, Y1 denotes a first image height, Y2 denotes a second image height, fYmin denotes the focal length at the image height of Ymin, fY1 denotes the focal length at the image height of Y1, fY2 denotes the focal length at the image height of Y2, BfYmin denotes the back focal length at the image height of Ymin, BfY1 denotes the back focal length at the image height of Y1, BfY2 denotes the back focal length at the imager height of Y2, FnoYmin denotes the f-number at the image height of Ymin, FnoY1 denotes the f-number at the image height of Y1, and FnoY2 denotes the f-number at the image height of Y2.

In Lens Data, surface number is the number of a lens surface counted in order from the object, r denotes a radius of curvature of a lens surface, d denotes a distance to the next lens surface, ν denotes Abbe number at d-line (λ=587.56 nm), and n denotes refractive index at d-line. "∞" denotes a plane surface. Refractive index of the air of 1.000000 is omitted.

In Aspherical Data, aspherical coefficients are expressed when an aspherical surface is assumed to be represented by the following expression:

$$X(y)=y^2/[r[1+(1-\kappa y^2/r^2)^{1/2}]]+C4y^4+C6y^6+C8y^8+C10y^{10}$$

where X(y) denotes a distance along the optical axis from tangent surface at the vertex of the aspherical surface to the aspherical surface at the height y, r denotes a paraxial radius of curvature (a radius of curvature of a reference sphere), κ denotes the conical coefficient, C4 denotes the 4th order aspherical coefficient, C6 denotes the 6th order aspherical coefficient, C8 denotes the 8th order aspherical coefficient, and C10 denotes the 10th order aspherical coefficient. In Zooming Data, the focal length and variable intervals in respective states of wide-angle end state and telephoto end state are shown.

In the tables for various values, "mm" is generally used for the unit of length such as the focal length, the radius of curvature, and the separation between optical surfaces. However, since an optical system proportionally enlarged or reduced its dimension can be obtained similar optical performance, the unit is not necessary to be limited to "mm" and any other suitable unit can be used. The explanation of reference symbols is the same in the other example.

TABLE 1

[Specifications]

| | |
|---|---|
| Ymin = | 3.00 |
| Y1 = | 3.52 |
| Y2 = | 3.75 |
| fYmin = | 5.04~14.25 |
| fY1 = | 5.57~15.71 |
| fY2 = | 5.91~16.71 |
| BfYmin = | 0.80 |
| BfY1 = | 0.80 |
| BfY2 = | 0.80 |
| FNoYmin = | 2.806~4.675 |
| FNoY1 = | 2.898~4.998 |
| FNoY2 = | 2.958~5.236 |

[Lens Data]

| Surface Number | r | d | ν | n |
|---|---|---|---|---|
| 1) | 118.1976 | 1.4000 | 40.71 | 1.806100 |
| 2) | 4.7668 | 1.4500 | | |
| 3) | 7.9031 | 2.2000 | 3.78 | 1.846660 |
| 4) | 23.3630 | (d4) | | |
| 5) | ∞ | 0.1000 | | Aperture Stop S |
| 6) | 8.0388 | 1.5000 | 59.44 | 1.583130 |
| 7) | −29.6110 | 0.2000 | | |
| 8) | 5.7475 | 1.8000 | 44.79 | 1.744000 |
| 9) | 23.4773 | 0.8000 | 23.78 | 1.846660 |
| 10) | 3.9181 | 0.8000 | | |
| 11) | −25.1787 | 1.1000 | 37.17 | 1.834000 |
| 12) | −14.5297 | (d12) | | |
| 13) | 19.9439 | 1.9000 | 52.32 | 1.755000 |
| 14) | −33.2754 | (d14) | | |
| 15) | ∞ | 1.6500 | 70.51 | 1.544370 |
| 16) | ∞ | 0.4900 | | |
| 17) | ∞ | 0.5000 | 64.14 | 1.516330 |
| 18) | ∞ | (Bf) | | |

[Aspherical Data]

Surface Number 2

$\kappa = -1.0250$
$C4 = 1.61930 \times 10^{-3}$
$C6 = -1.70720 \times 10^{-5}$
$C8 = 2.70360 \times 10^{-7}$
$C10 = -2.16820 \times 10^{-9}$ Surface Number 7

$\kappa = -86.4358$
$C4 = -9.31700 \times 10^{-3}$
$C6 = 3.50070 \times 10^{-5}$
$C8 = -3.91250 \times 10^{-6}$
$C10 = 2.70230 \times 10^{-7}$

[Zooming Data]

| | Wide-angle end state | Telephoto end state |
|---|---|---|
| fYmin | 5.04 | 14.25 |
| d4 | 17.17 | 3.06 |
| d12 | 4.75 | 14.45 |
| d14 | 0.96 | 1.77 |
| fY1 | 5.57 | 15.71 |
| d4 | 14.98 | 2.53 |
| d12 | 5.15 | 16.27 |
| d14 | 1.09 | 1.58 |
| fY2 | 5.91 | 16.71 |
| d4 | 13.77 | 2.24 |
| d12 | 5.43 | 17.49 |
| d14 | 1.17 | 1.39 |

TABLE 1-continued

[Values for Conditional Expressions]

(Y1/Ymin) × fwYmin = 6.254
(Y2/Ymin) × fwYmin = 6.716

EXAMPLE 2

Figure 3:
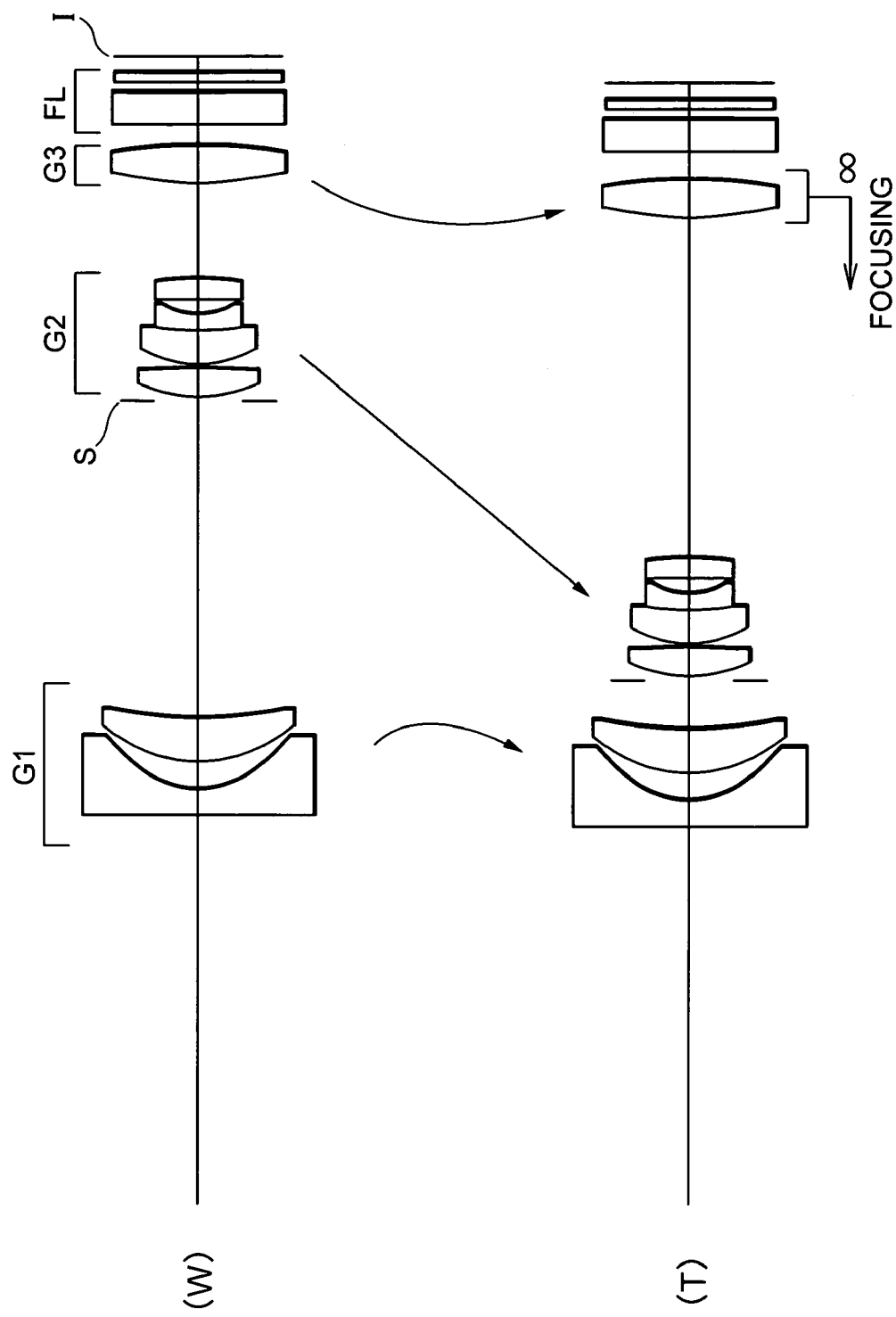
FIG. 3 is a diagram showing a sectional view of a zoom lens system according to Example 2 of the present invention in a wide-angle end state (W) and a telephoto end state (T).
Figure 4:
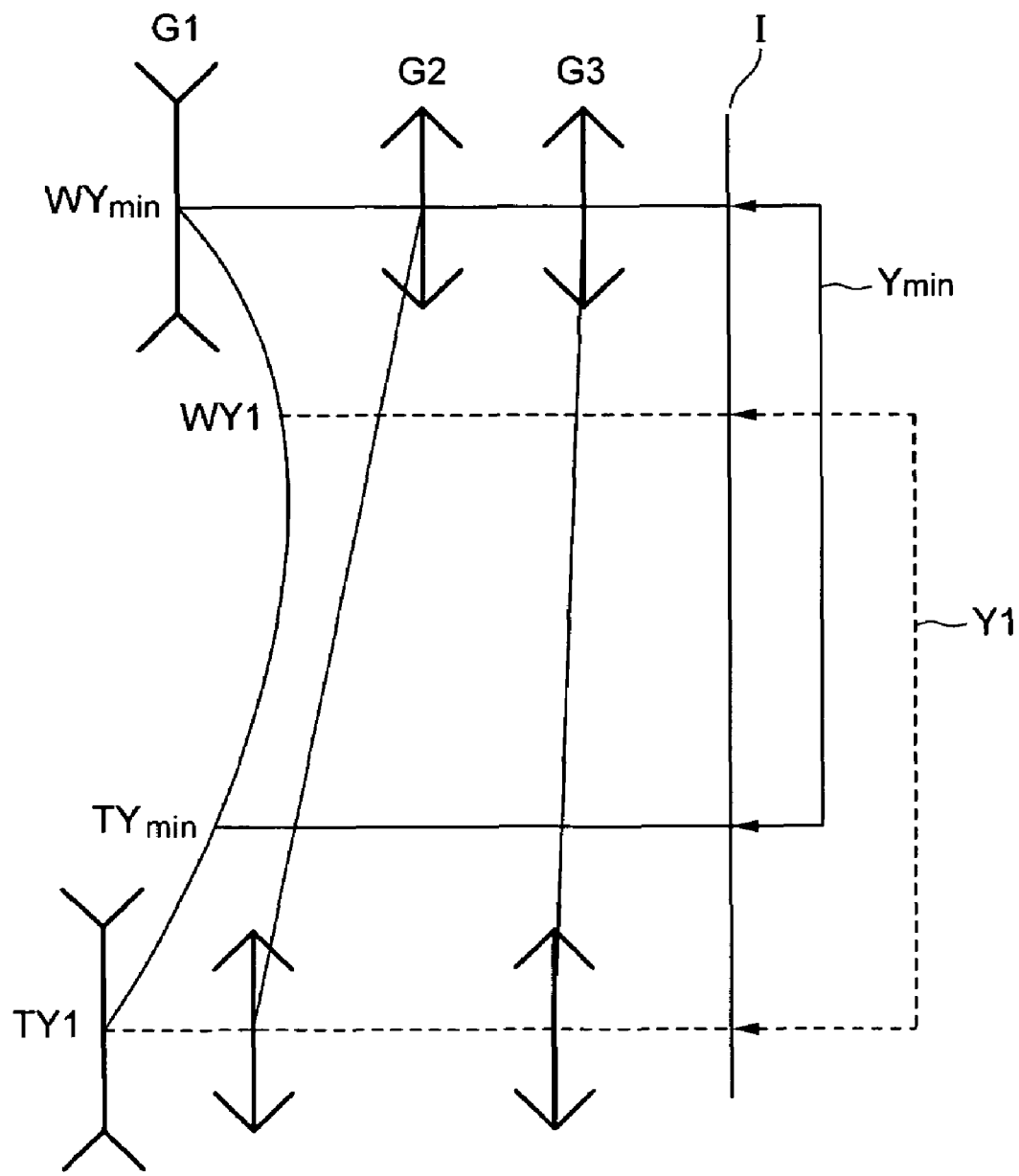
FIG. 4 is a drawing illustratively showing power arrangement and zoom trajectories corresponding to a plurality of imaging devices with different image heights of a zoom lens system according to Example 2 of the present invention.

FIG. 3 is a diagram showing a sectional view of a zoom lens system according to Example 2 of the present invention in a wide-angle end state (W) and a telephoto end state (T). FIG. 4 is a drawing illustratively showing power arrangement and zoom trajectories corresponding to two imaging devices with different image heights of a zoom lens system according to Example 2 of the present invention.

In FIG. 3, the zoom lens system has, in order from the object side, a first lens group G1 having negative refractive power, a second lens group G2 having positive refractive power, a third lens group G3 having positive refractive power. When the state of lens group positions varies from a wide-angle end state (W) to a telephoto end state (T), the first lens group G1, the second lens group G2, and the third lens group G3 move such that a distance between the first lens group G1 and the second lens group G2 decreases and a distance between the second lens group G2 and the third lens group G3 varies. Focusing is carried out by moving the third lens group G3. An aperture stop S is arranged between the first lens group G1 and the second lens group G2, and is moved with the second lens group G2 in a body upon zooming.

A filter group FL composed of a low-pass filter, an IR (infrared) cutoff filter, and the like is arranged between the third lens group G3 and an image plane I.

In FIG. 4, when a zoom lens system according to Example 2 of the present invention is used for two imaging devices with different image heights with each other, the respective zoom trajectories are shown.

Among the imaging devices which the zoom lens system is applicable to, when an imaging device having the smallest image height Ymin is used, the state of the wide-angle end is expressed by WYmin and the state of the telephoto end is expressed by TYmin. When an imaging device having the image height of Y1 is used, the state of the wide-angle end is expressed by WY1 and the state of the telephoto end is expressed by TY1.

As is understood from FIG. 4, in the zoom lens system according to Example 2 of the present invention, in accordance with two imaging devices having different heights with each other, three lens groups G1–G3 are moved in respective different ranges along respective common zoom trajectories upon zooming, so that approximately the same zoom ratio and image size can be secured without lowering optical performance.

A zoom lens system according to Example 2 of the present invention is constructed such that the zoom trajectories can be varied from the wide-angle end state WYmin to the telephoto end state TYmin and a range in the zoom trajectories can be selected in accordance with the image height of an imaging device, so that it is applicable to imaging devices having different image heights.

Various values according to Example 2 are shown in Table 2.

TABLE 2

[Specifications]

| | |
|---|---|
| Ymin = | 3.00 |
| Y1 = | 3.52 |
| fYmin = | 5.14~14.54 |
| fY1 = | 5.56~15.71 |
| BfYmin = | 0.80 |
| BfY1 = | 0.80 |
| FNoYmin = | 2.800~4.980 |
| FNoY1 = | 2.900~5.200 |

[Lens Data]

| Surface Number | r | d | ν | n |
|---|---|---|---|---|
| 1) | 81.1456 | 1.3000 | 40.71 | 1.806100 |
| 2) | 4.4868 | 1.3000 | | |
| 3) | 7.3521 | 2.2000 | 23.78 | 1.846660 |
| 4) | 21.5379 | (d4) | | |
| 5> | ∞ | 0.4000 | Aperture Stop S | |
| 6) | 8.0088 | 1.5000 | 59.44 | 1.583130 |
| 7) | −22.6102 | 0.2000 | | |
| 8) | 5.2078 | 1.6000 | 44.79 | 1.744000 |
| 9) | 18.6470 | 0.8000 | 23.78 | 1.846660 |
| 10) | 3.6276 | 0.8000 | | |
| 11) | −17.5400 | 1.0000 | 37.17 | 1.834000 |
| 12) | −13.4024 | (d12) | | |
| 13) | 14.6125 | 2.2000 | 52.32 | 1.755000 |
| 14) | −37.0829 | (d14) | | |
| 15) | ∞ | 2.2600 | 70.51 | 1.544370 |
| 16) | ∞ | 0.7100 | | |
| 17) | ∞ | 0.5000 | 64.14 | 1.516330 |
| 18) | ∞ | (Bf) | | |

[Aspherical Data]

Surface Number 2

κ = 0.1597
C4 = 3.63350 × $10^{-4}$
C6 = 3.98940 × $10^{-6}$
C8 = 2.22750 × $10^{-8}$
C10 = −2.4942 × $10^{-9}$

Surface Number 7 k = −21.1166
C4 = 1.32910 × $10^{-4}$
C6 = 6.98790 × $10^{-6}$
C8 = 8.92010 × $10^{-8}$
C10 = 3.64950 × $10^{-8}$

[Zooming Data]

| | Wide-angle end state | Telephoto end state |
|---|---|---|
| fYmin | 5.14 | 14.54 |
| d4 | 13.84 | 2.57 |
| d12 | 4.10 | 15.5 |
| d14 | 0.84 | 0.84 |
| fY1 | 5.56 | 15.71 |
| d4 | 12.55 | 2.11 |
| d12 | 4.62 | 16.93 |
| d14 | 0.83 | 0.87 |

[Values for Conditional Expressions]

(Y1/Ymin) × fwYmin = 6.043

As described above, the present invention makes it possible to provide a zoom lens system having a zoom ratio of 2.5 or more, compactness and high optical performance, applicable to a plurality of imaging devices with different image heights.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising:
a first movable lens group; and
a second movable lens group,
the first movable lens group and the second movable lens group being applicable to a plurality of imaging devices having different image heights from each other by partially sharing zooming trajectories of at least the first movable lens group and the second movable lens group among the imaging devices.

2. The zoom lens system according to claim 1, wherein the following conditional expression is satisfied:

$$fwY \leq (Y/Ymin) \times fwYmin$$

where Y denotes an image height of one imaging device among the plurality of imaging devices, fwY denotes the focal length in a wide-angle end state of the imaging device with the image height of Y, Ymin denotes the smallest image height among the plurality of imaging devices, and fwYmin denotes the focal length in the wide-angle end state of the imaging device having the image height Ymin.

3. The zoom lens system according to claim 2, wherein a most object side lens group has negative refractive index.

4. The zoom lens system according to claim 3, wherein when the most object side lens group having negative refractive power is a first lens group, and the zoom lens system includes, in order from the object, the first lens group, a lens group having positive refractive power, and another lens group having positive refractive power.

5. The zoom lens system according to claim 4, wherein focusing is carried out by moving either the most object side lens group or a most image side lens group along an optical axis.

6. The zoom lens system according to claim 3, wherein focusing is carried out by moving either the most object side lens group or a most image side lens group along an optical axis.

7. The zoom lens system according to claim 2, wherein focusing is carried out by moving either a most object side lens group or a most image side lens group along an optical axis.

8. The zoom lens system according to claim 1, wherein a most object side lens group has negative refractive index.

9. The zoom lens system according to claim 8, wherein when the most object side lens group having negative refractive power is a first lens group, and the zoom lens system includes, in order from the object, the first lens group, a lens group having positive refractive power, and another lens group having positive refractive power.

10. The zoom lens system according to claim 9, wherein focusing is carried out by moving either the most object side lens group or a most image side lens group along an optical axis.

11. The zoom lens system according to claim 8, wherein focusing is carried out by moving either the most object side lens group or a most image side lens group along an optical axis.

12. The zoom lens system according to claim 1, wherein focusing is carried out by moving either a most object side lens group or a most image side lens group along an optical axis.

13. A zoom lens system comprising:
a first movable lens group; and
a second movable lens group,
the first movable lens group and the second movable lens group being applicable to a plurality of imaging devices having different image heights from each other by changing zooming trajectories of at least the first movable lens group and the second movable lens group in accordance with each of the imaging devices.

14. A zoom lens system applicable to a plurality of imaging devices having different image heights from each other by partially sharing zooming trajectories without changing an optical element of the zoom lens system,
wherein the following conditional expression is satisfied:

$$fwY \leq (Y/Ymin) \times fwYmin$$

where Y denotes an image height of one imaging device among the plurality of imaging devices, fwY denotes the focal length in a wide-angle end state of the imaging device with the image height of Y, Ymin denotes the smallest image height among the plurality of imaging devices, and fwYmin denotes the focal length in the wide-angle end state of the imaging device having the image height Ymin.

15. The zoom lens system according to claim 14, wherein a most object side lens group has negative refractive index.

16. The zoom lens system according to claim 15, wherein when the most object side lens group having negative refractive power is a first lens group, and the zoom lens system includes, in order from the object, the first lens group, a second lens group having positive refractive power, and a third lens group having positive refractive power.

17. The zoom lens system according to claim 16, wherein focusing is carried out by moving either the most object side lens group or a most image side lens group along an optical axis.

18. The zoom lens system according to claim 15, wherein focusing is carried out by moving either the most object side lens group or a most image side lens group along an optical axis.

19. The zoom lens system according to claim 14, wherein focusing is carried out by moving either a most object side lens group or a most image side lens group along an optical axis.

20. The zoom lens system according to claim 2, wherein a most object side lens group comprises at least two lens elements.

21. The zoom lens system according to claim 1, wherein a most object side lens group comprises at least two lens elements.

22. The zoom lens system according to claim 1, wherein the first movable lens group is a first lens group in order from an object.

23. The zoom lens system according to claim 1, wherein the second movable lens group is a second lens group in order from an object.

24. A method for forming a common optical lens system applicable to plural cameras having different respective image heights, said method comprising the step of:
providing at least two movable lens groups having respective zooming trajectories which are partially shared between the plural cameras.

25. The method according to claim 24, wherein a most object side lens group of the common optical lens system has negative refractive power.

26. The method according to claim 25, wherein the common optical system comprises, in order from the object, the most object side lens group having negative refractive power as a first lens group, a second lens group having positive refractive power and a third lens group having positive refractive power.

27. The zoom lens system according to claim 24, wherein the following conditional expression is satisfied:

$$fwY \leq (Y/Ymin) \times fwYmin$$

where Y denotes an image height of one camera among the plural cameras fwY denotes the focal length in a wide-angle end state of the imaging device with the image height of Y, Ymin denotes the smallest image height among the plural cameras, and fwYmin denotes the focal length in the wide-angle end state of the camera having the image height Ymin.

* * * * *